A. A. TIRRILL.
VOLTAGE REGULATOR.
APPLICATION FILED OCT. 4, 1911. RENEWED APR. 14, 1915.

1,147,569.

Patented July 20, 1915.

WITNESSES:

INVENTOR
Allen A. Tirrill
BY
ATTORNEY

UNITED STATES PATENT OFFICE.

ALLEN A. TIRRILL, OF PITTSBURGH, PENNSYLVANIA, ASSIGNOR TO WESTINGHOUSE ELECTRIC & MANUFACTURING COMPANY, A CORPORATION OF PENNSYLVANIA.

VOLTAGE-REGULATOR.

1,147,569.

Specification of Letters Patent. Patented July 20, 1915.

Application filed October 4, 1911, Serial No. 652,842. Renewed April 14, 1915. Serial No. 21,447.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Voltage-Regulators, of which the following is a specification.

My invention relates to voltage and current regulators, and it has for its object to provide a simple and effective regulator for the field excitation of a dynamo-electric machine.

Figure 1:
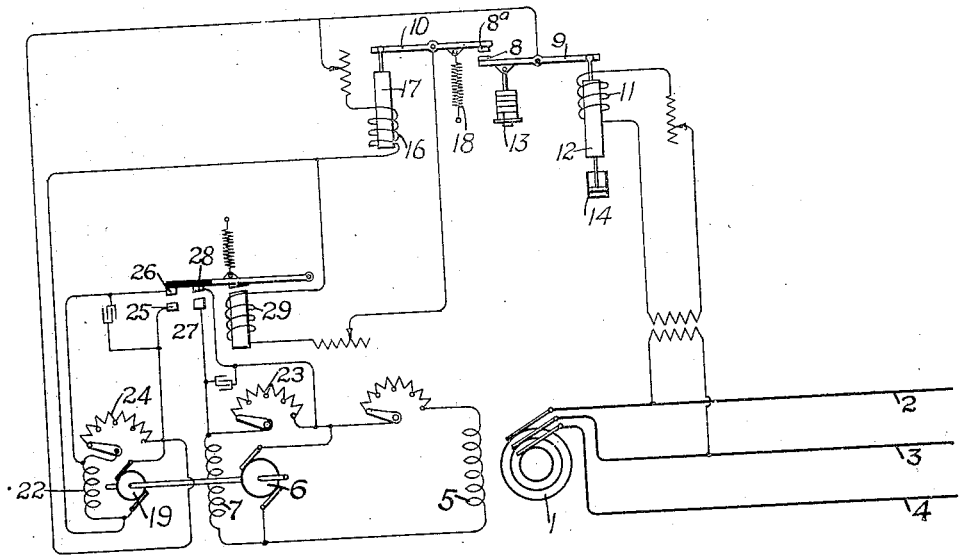
Figure 2:
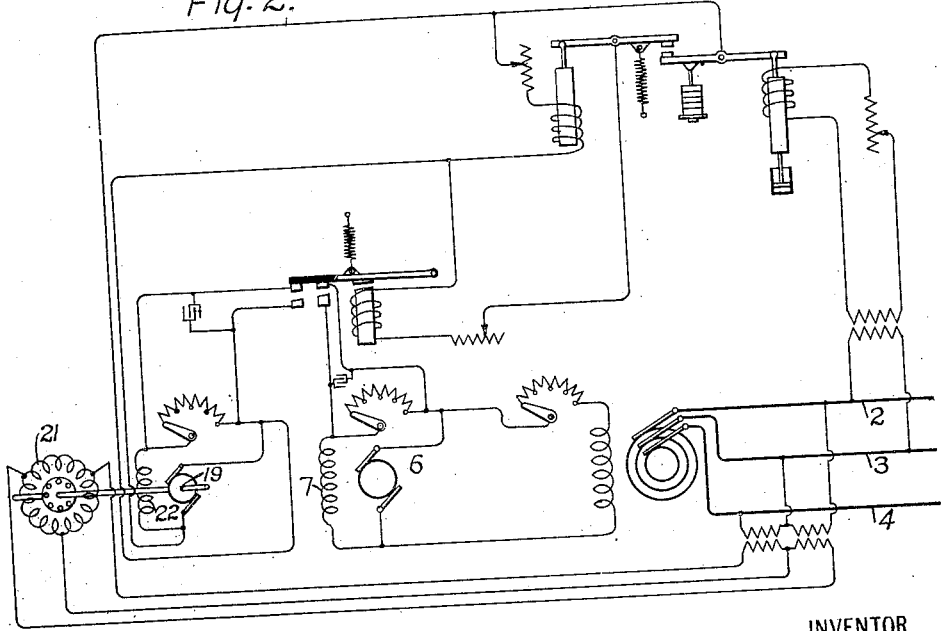

My invention is illustrated in the accompanying drawing, Figure 1 of which is a diagrammatic view of a system embodying the same, and Fig. 2 is a similar view of a modification of the system of Fig. 1.

As illustrated, the system in connection with which the present invention is employed comprises a generator 1, that is connected to a distributing circuit 2—3—4, and the field magnet 5 of which is supplied from the armature 6 of an exciter having a field magnet winding 7 that is shunt-excited, or that may be excited from any other suitable source.

The regulator comprises two coöperating movable contact members 8 and 8ª that are respectively carried by levers 9 and 10, the lever 9 being actuated by an electromagnet winding 11 that receives energizing current from the distributing circuit 2—3—4. The core 12 of the winding 11 is partially counter-balanced by an adjustable counter-weight 13, and the movements of the lever 9 and contact member 8 are retarded by means of a dash pot 14. The winding 11 is energized to varying degrees by variations of the voltage of the circuit 2—3—4, and accordingly raises and lowers the core 12, thereby varying the distance of the contact member 8 from the member 8ª. If desired, instead of supplying the winding 11 with current proportional to the voltage of the circuit 2—3—4, it may be connected in series with one of the conductors of the said circuit, or otherwise suitably supplied with current proportional to that traversing the said circuit. The contact member 8 may also be actuated in response to variations of any other desired electrical condition of the circuit 2—3—4, or of the generator 1.

The contact member 8ª and the lever 10 are actuated by an electromagnet winding 16 having a core 17 that is carried by the lever 10 and is somewhat more than counter-balanced by a spring 18. The winding 16 is supplied from the armature 19 of a small auxiliary generator that may be, as illustrated in Fig. 1, directly connected to the exciter, or otherwise arranged to be driven by the same or any other source of power, or, as illustrated in Fig. 2, it may be driven by a separate small motor 21 that is supplied with current from the distributing circuit 2—3—4. The auxiliary generator is provided with a field magnet winding 22 that is preferably shunt-excited from the armature 19, though it may be supplied with current from any other suitable source. In series with the field magnet windings 7 and 22, are resistors 23 and 24, respectively, that are adapted to be periodically shunted by a relay having two pairs of coöperating stationary and movable contact terminals 25, 26, 27 and 28 that are connected, as shown, to the terminals of the resistors. The movable contact members 26 and 28 are actuated by an electromagnet winding 29, the circuit of which is controlled by the contact terminals 8 and 8ª and is supplied with current from the armature 19 of the auxiliary generator. If desired, a plurality of relays may be employed instead of the single relay shown, their actuating windings being connected in parallel.

In the operation of the regulator, the position of the contact terminal 8 is caused to vary, by the winding 11, in accordance with variations of the voltage or other desired electrical condition of the circuit 2—3—4, and the contact terminal 8ª is moved into and out of engagement with the terminal 8 by reason of the fluctuations of the voltage of the auxiliary generator caused by the alternate opening and closing of the shunt circuit to the resistor 24. Thus, if the voltage of the circuit 2—3—4 diminishes, the contact terminal 8 will be raised and, by reason of the engagement of the contact terminal 8ª therewith, the circuit of the relay magnet winding 29 will be established, with the result that the resistors 23 and 24 will be shunted. Upon shunting of the resistor 23, the field excitation and voltage of the exciter increase, followed by a corresponding increase of the excitation of the field of the main generator. This, in turn, raises the voltage of the circuit 2—3—4, accompanied by a lowering of the contact terminal 8 by reason of the greater energization of the winding 11. When the resistor 24 is shunted, the field excitation and voltage of the auxiliary generator also increase, accompanied by an increase of the energization of the winding 16, which thereupon moves the contact terminal 8ᵃ out of engagement with the contact terminal 8. Upon separation of the contact terminals 8 and 8ᵃ, the relay magnet winding 29 is deënergized and the shunt circuits to the resistors 23 and 24 are interrupted, causing the voltages of the exciter and auxiliary generator to be again diminished. This is followed by reëngagement of the contact terminals 8 and 8ᵃ, and the contact terminals 8 and 8ᵃ are thus moved into and out of engagement during the continued operation of the regulator.

As the position of the contact member 8 varies with the electrical condition of the distributing circuit, the periods of engagement and disengagement of the said member with the member 8ᵃ will correspondingly vary, with the result that the excitation of the main generator will, by a proper construction and adjustment of the apparatus, be caused to vary in such a manner as to maintain the voltage or other desired electrical condition at substantially the required value.

Since the resistors 23 and 24 are shunted substantially simultaneously, it is obvious that the fluctuations of the voltage of the auxiliary generator will be similar and correspond to the fluctuations of the exciter voltage. In order to secure promptness, and the proper degree, of regulation of the excitation of the main generator, it is usually necessary that the exciter voltage be capable of fluctuation between wide limits. On the other hand, it is desirable that the voltage applied to the windings 16 and 29 should not fluctuate so greatly, and this condition is obtainable in the present instance by constructing the exciter and the auxiliary generator, and by adjusting the resistances of their field circuits, so that the ranges of their generated voltages may bear any desired relation to each other. When a motor is employed for driving the auxiliary generator, the regulator may be readily adapted for use with any main generator or any exciter, irrespective of their voltages, and without change of the regulator coils or other parts, by simply employing a transformer of the proper ratio between the circuit 2—3—4 and the said motor. This is of great advantage to both manufacturer and user, since the regulators may be carried complete in stock ready for shipment and use, and then may be adapted for use under widely varying conditions without modification.

The present regulator may be employed for regulating in accordance with variations of any other electrical condition than voltage, and for many other conditions than that specifically shown, and it may be employed in connection with direct current machines, as well as with alternators.

I claim as my invention:

1. The combination with a dynamo-electric machine, an exciter therefor, and an auxiliary generator, of resistors in the respective circuits of the field magnet windings of the exciter and auxiliary generator, and means, independent of variations of the exciter voltage but responsive to variations of the respective voltages of the dynamo-electric machine and the auxiliary generator for short-circuiting the said resistors.

2. The combination with a dynamo-electric machine, an exciter therefor, and an auxiliary generator, of resistors in the respective circuits of the field magnet windings of the exciter and auxiliary generator, and means, independent of variations of the exciter voltage but responsive to variations of the electrical conditions of the dynamo-electric machine and the auxiliary generator for short-circuiting the said resistors.

3. The combination with a dynamo-electric machine, an exciter therefor, and an auxiliary generator, the said exciter and auxiliary generator having independent field and armature circuits, of a regulator for the dynamo-electric machine comprising means for correspondingly adjusting the resistances of the respective field circuits of the exciter and the auxiliary generator.

4. The combination with a dynamo-electric machine, an exciter therefor, and an auxiliary generator, the said exciter and auxiliary generator having independent field and armature circuits, of a regulator for the dynamo-electric machine comprising means for correspondingly adjusting the respective field strengths of the exciter and the auxiliary generator.

5. The combination with an electrical circuit, a dynamo-electric machine associated therewith, an exciter for the dynamo-electric machine, and an auxiliary generator having an armature circuit independent of that of the exciter, of means for correspondingly adjusting the resistances of the respective field circuits of the exciter and the auxiliary generator in response to variations of the respective electrical conditions of the said circuit and the auxiliary generator.

In testimony whereof, I have hereunto subscribed my name this 3rd day of October, 1911.

ALLEN A. TIRRILL.

Witnesses:
OTTO S. SCHAIRER,
B. B. HINES.